(12) United States Patent
Yoo et al.

(10) Patent No.: US 11,541,689 B2
(45) Date of Patent: Jan. 3, 2023

(54) AXLE ASSEMBLY FOR DRIVE WHEELS OF VEHICLES

(71) Applicants: Hyundai Motor Company, Seoul (KR); Kia Motors Corporation, Seoul (KR); Hyundai Wia Corporation, Gyeongsangnam-do (KR)

(72) Inventors: Sung Su Yoo, Gyeonggi-do (KR); Won Jun Choi, Gyeongsangnam-do (KR); Hee Il Kim, Gyeonggi-do (KR); Bum Jae Lee, Gyeonggi-do (KR); Chang Hee Jeong, Gyeonggi-do (KR); Ki Dong Park, Gyeonggi-do (KR)

(73) Assignees: Hyundai Motor Company, Seoul (KR); Kia Motors Corporation, Seoul (KR); Hyundai Wia Corporation, Gyeongsangnam-do (KR)

(*) Notice: Subject to any disclaimer, the term of this patent is extended or adjusted under 35 U.S.C. 154(b) by 230 days.

(21) Appl. No.: 16/861,898

(22) Filed: Apr. 29, 2020

(65) Prior Publication Data
US 2020/0369084 A1 Nov. 26, 2020

(30) Foreign Application Priority Data
May 20, 2019 (KR) .................. 10-2019-0058889

(51) Int. Cl.
*B60B 27/00* (2006.01)
*B60B 35/18* (2006.01)
(Continued)

(52) U.S. Cl.
CPC ............ *B60B 35/18* (2013.01); *B60B 7/0013* (2013.01); *B60B 27/0005* (2013.01);
(Continued)

(58) Field of Classification Search
CPC ............ B60B 27/0005; B60B 27/0078; B60B 27/0084; B60B 35/18; F16C 19/186;
(Continued)

(56) References Cited

U.S. PATENT DOCUMENTS 5,486,053 A * 1/1996 Beagley ................ F16D 65/123
464/178
6,280,336 B1 8/2001 Sone et al.
(Continued)

FOREIGN PATENT DOCUMENTS

DE 19811184 A1 * 9/1999 ......... B60B 27/0005
JP H08-91187 4/1996
(Continued)

OTHER PUBLICATIONS

DE19811184desc_machine_translation.*

*Primary Examiner* — Phillip A Johnson
(74) *Attorney, Agent, or Firm* — Fox Rothschild LLP (57) ABSTRACT

An axle assembly for drive wheels of vehicles includes a steering knuckle, an axle housing coupled to an inside of the steering knuckle, a wheel disc that is fixed to the axle housing to be rotatable integrally with the axle housing, and a drive shaft that is coupled to the axle housing to be rotatable integrally with the axle housing. A hub bearing is disposed between the steering knuckle and the axle housing. A forming part is formed at an end of the axle housing in a state in which a bearing inner race of the hub bearing is coupled to an outer circumferential surface of the axle housing, and the bearing inner race is engaged with a side part of the axle housing by the forming part in a state in which the forming part is pressed against a side end of the bearing inner race.

13 Claims, 5 Drawing Sheets

(51) Int. Cl.
  *B60B 7/00* (2006.01)
  *F16C 19/18* (2006.01)
(52) U.S. Cl.
  CPC ........ *B60B 27/0078* (2013.01); *F16C 19/186* (2013.01); *F16C 2326/02* (2013.01)
(58) Field of Classification Search
  CPC ............... F16C 33/586; F16C 2226/12; F16C 2226/52; F16C 2326/02
  See application file for complete search history.

(56) References Cited

U.S. PATENT DOCUMENTS

| | | | |
|---|---|---|---|
| 6,368,223 B1 | 4/2002 | Ouchi et al. | |
| 8,668,393 B2 * | 3/2014 | Siebeneick | F16D 3/224 |
| | | | 384/544 |
| 2010/0146790 A1 * | 6/2010 | Gingrich | F16C 43/04 |
| | | | 29/898 |
| 2015/0191044 A1 * | 7/2015 | Inoue | F16C 19/186 |
| | | | 384/512 |
| 2016/0375725 A1 * | 12/2016 | Bosco | F16C 19/28 |
| | | | 301/6.1 |

FOREIGN PATENT DOCUMENTS

| | | | | |
|---|---|---|---|---|
| JP | 2001-233009 | | 8/2001 | |
| JP | 2001233006 A | * | 8/2001 | .............. F16C 33/60 |
| KR | 10-2015-0049727 | | 5/2015 | |
| KR | 10-2019-0037393 | | 4/2019 | |
| WO | WO-2008128515 A1 | * | 10/2008 | ......... B60B 27/0005 |

* cited by examiner

FIG. 1

RELATED ART

AXLE ASSEMBLY FOR DRIVE WHEELS OF VEHICLES

CROSS-REFERENCE TO RELATED APPLICATION

This application claims under 35 U.S.C. § 119(a) the benefit of priority to Korean Patent Application No. 10-2019-0058889 filed on May 20, 2019, the entire contents of which are incorporated herein by reference.

BACKGROUND

(a) Technical Field

The present disclosure relates to an axle assembly for drive wheels of vehicles, and more particularly, to an axle assembly for drive wheels of vehicles which prevents occurrence of noise and backlash at a coupling part between a wheel hub and a drive shaft, loosening of a caulking nut, loosening of a locking nut, etc.

(b) Background Art

As is known well, an axle assembly including a steering knuckle, a wheel hub, a hub bearing, a wheel disc, a drive shaft, etc. is installed at a drive wheel or a non-drive wheel to drive a vehicle. The axle assembly for drive wheels transmits driving force generated and provided by a powertrain, such as an engine (or a motor or both the engine and the motor), a transmission, etc., to a drive wheel, and supports the vehicle weight and force applied by a road surface through the drive wheel.

In the conventional axle assembly, when power is transmitted to a coupling part between a wheel hub and a drive shaft spline-coupled thereto, problems, such as occurrence of noise and backlash at the spline-coupling part, loosening of a caulking nut, etc., occur. Further, among two shafts of the drive shaft, which are connected to each other by a wheel-side joint, one shaft extends a lengthwise and passes through the center of the wheel hub, and a joint housing is disposed at the end of the shaft to form a constant velocity joint (e.g., the wheel-side joint), thereby forming a long length between the center of the wheel and the center of the constant velocity joint.

The above information disclosed in this section is merely for enhancement of understanding of the background of the disclosure and therefore it may contain information that does not form the prior art that is already known in this country to a person of ordinary skill in the art.

SUMMARY

The present disclosure provides an axle assembly for drive wheels of vehicles which prevents occurrence of noise a backlash at a coupling part between a wheel hub and a drive shaft, loosening of a caulking nut, loosening of a locking nut, etc.

In one aspect, the present disclosure provides an axle assembly for drive wheels of vehicles that may include a steering knuckle connected to a steering apparatus, an axle housing coupled to an inside of the steering knuckle, a wheel disc fixed to the axle housing to be rotatable integrally with the axle housing, a drive shaft coupled to the axle housing to be rotatable integrally with the axle housing, and a hub bearing coupled to the steering knuckle and the axle housing to be disposed therebetween. A forming part configured to be bent outwards in a radial direction may be formed at an end of the axle housing in a state in which a bearing inner race of the hub bearing is coupled to an outer circumferential surface of the axle housing, and the bearing inner race may be engaged with a side part of the axle housing by the forming part in a state in which the forming part is pressed against a side end of the bearing inner race to integrally couple the axle housing and the bearing inner race to each other.

In an exemplary embodiment, the forming part may be formed by performing an orbital forming process on the end of the axle housing. In addition, recesses for preventing rotation may be formed in the bearing inner race, and protrusions configured to be inserted into the recesses may be formed on the axle housing, to prevent rotation of the bearing inner race within the axle housing in a state in which the protrusions of the axle housing are inserted into the recesses of the bearing inner race.

The protrusions may be formed at the forming part of the axle housing. The forming part may be formed by performing an orbital forming process on the end of the axle housing, and the protrusions may be formed by deforming at least portions of the end of the axle housing to be inserted into the recesses of the bearing inner race during the orbital forming process.

Further, recesses for preventing rotation may be formed in the axle housing, and protrusions configured to be inserted into the recesses may be formed on the bearing inner race, to prevent rotation of the bearing inner race within the axle housing in a state in which the protrusions of the bearing inner race are inserted into the recesses of the axle housing. The recesses may be formed in the forming part of the axle housing.

In another exemplary embodiment, the forming part may be formed by performing an orbital forming process on the end of the axle housing, and the recesses may be formed by deforming the end of the axle housing by inserting the protrusions of the bearing inner race into the end of the axle housing during the orbital forming process. The hub bearing may include a bearing outer race inserted into the steering knuckle by press fitting, the bearing inner race coupled to an outer circumferential surface of a first side part of the axle housing, and balls and a bearing cage interposed between the bearing outer race and the bearing inner race and between the bearing outer race and a second side part of the axle housing.

Further, a boot installed to surround a coupling part between the drive shaft and a wheel-side joint may be fixedly coupled to an outer circumferential surface of the bearing inner race of the hub bearing. A plurality of balls may be interposed between an outer circumferential surface of a first side part of the bearing inner race and the bearing outer race of the hub bearing, and a band may be coupled to an outer surface of the boot in a state in which an inner surface of the boot is pressed against an outer circumferential surface of a second side part of the bearing inner race to fix the boot to the bearing inner race by the band.

A joint housing may be formed integrally with the axle housing, and a joint sub-assembly, including balls and a cage, of the drive shaft may be coupled to an inside of the joint housing of the axle housing to couple the drive shaft and the axle housing to each other to be integrally rotated by a wheel-side joint including the joint housing and the joint sub-assembly. In addition, an opening may be formed through the joint housing, and a hub cap may be detachably coupled to the opening to close the opening. One of an integrated-type wheel guide configured to be formed integrally with the joint housing, and a separated-type wheel guide configured to be detachably coupled to the joint housing may be provided.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment. In the figures, reference numbers refer to the same or equivalent parts of the present disclosure throughout the several figures of the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will be made in detail to various exemplary embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

Figure 1:
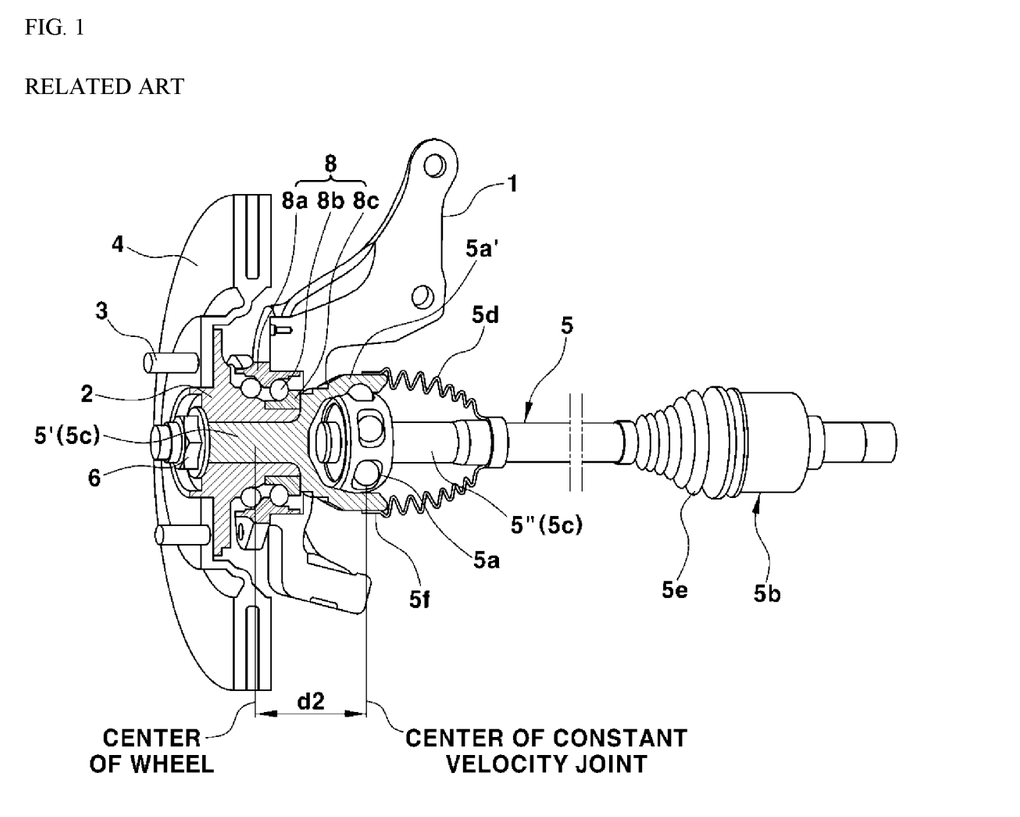
FIG. 1 is a partial cross-sectional view illustrating a conventional axle assembly for drive wheels of vehicles according to the related art.

First, to help understanding of the present disclosure, a conventional axle assembly for drive wheels and problems thereof will be described. As shown in FIG. 1 of the related art, the conventional axle assembly includes a steering knuckle 1 connected to a steering apparatus of a vehicle, a wheel hub 2 coupled to the inside of the steering knuckle 1, a wheel disc 4 fixed to the outer circumferential part of the wheel hub 2 by bolts 3, a drive shaft 5 which passes through and is inserted into the center of the wheel hub 2 and is spline-coupled to the inner circumferential surface of the wheel hub 2, and a caulking nut 6 that fixes and couples the drive shaft 5 to the wheel hub 2.

In addition, a hub bearing 8 includes a bearing outer race 8a which is inserted into the steering knuckle 1 by press fitting, a bearing inner race 8b coupled to the outer circumferential surface of the wheel hub 2, and balls 8c and a bearing cage (not shown) interposed between the bearing outer race 8a and the bearing inner race 8b and between the bearing outer race 8a and the wheel hub 2. The drive shaft 5 is configured to transmit driving force of a powertrain (not shown) to a drive wheel (not shown), and is provided as an assembly into which a wheel-side joint 5a, a powertrain-side joint 5b, a shaft 5c and boots 5d and 5e are combined. In particular, the wheel-side joint 5a is a well-known constant velocity joint, as shown in FIG. 1.

Referring to FIG. 1, in the conventional axle assembly, the driving force generated by an engine (not shown), a motor (not shown), or both the engine and the motor is transmitted to a transmission (not shown), and the driving force output from the transmission is transmitted to the drive wheel through the drive shaft 5. In particular, the wheel-side joint 5a of the drive shaft 5 is the constant velocity joint which is configured to connect two shafts 5' and 5" to integrally rotate the shafts 5' and 5", and one of the two shafts 5' and 5", i.e., the shaft 5', passes through the center of the wheel hub 2 and is spline-coupled to the inner circumferential surface of the wheel hub 2 to be rotatable integrally with the wheel hub 2.

Accordingly, the shaft 5' passing through the wheel hub 2 is spline-coupled to the wheel hub 2 so that the entirety of the drive shaft 5 is rotatable integrally with the wheel hub 2. Further, a joint housing (outer race) 5a' forming the constant velocity joint is formed integrally with the end of the shaft 5' passing through the wheel hub 2, and the boot (dust cover) 5d is coupled to the outer circumferential surface of the joint housing 5a' by a band 5f.

In the conventional axle assembly, when power is transmitted to a coupling part between the wheel hub 2 and the drive shaft 5 spline-coupled thereto, problems, such as occurrence of noise, backlash at the spline-coupling part therebetween, loosening of a caulking nut, etc., occur. Further, as shown in FIG. 1, among the two shafts 5' and 5" connected by the wheel-side joint 5a of the drive shaft 5, one shaft, i.e., the shaft 5', extends a lengthwise and passes through and is inserted into the center of the wheel hub 2, and the joint housing 5a' is disposed at the end of the shaft 5' to form the constant velocity joint (wheel-side joint) 5a, thereby forming a long length between the center of the wheel and the center of the constant velocity joint.

Figure 2:
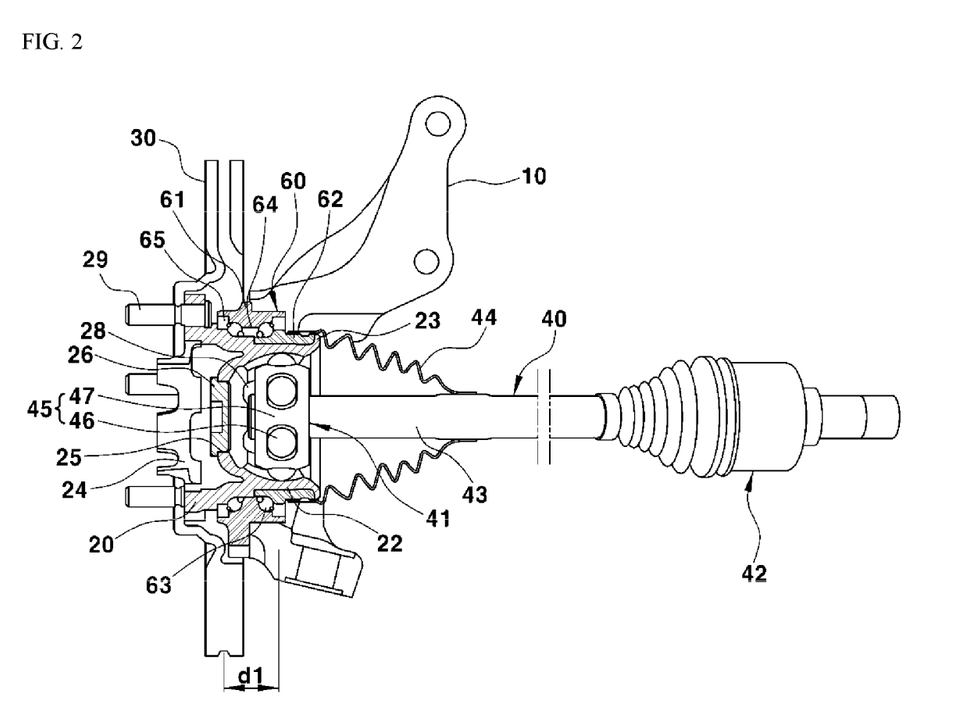
FIG. 2 is a partial cross-sectional view illustrating an axle assembly for drive wheels of vehicles according to one exemplary embodiment of the present disclosure.
Figure 3:
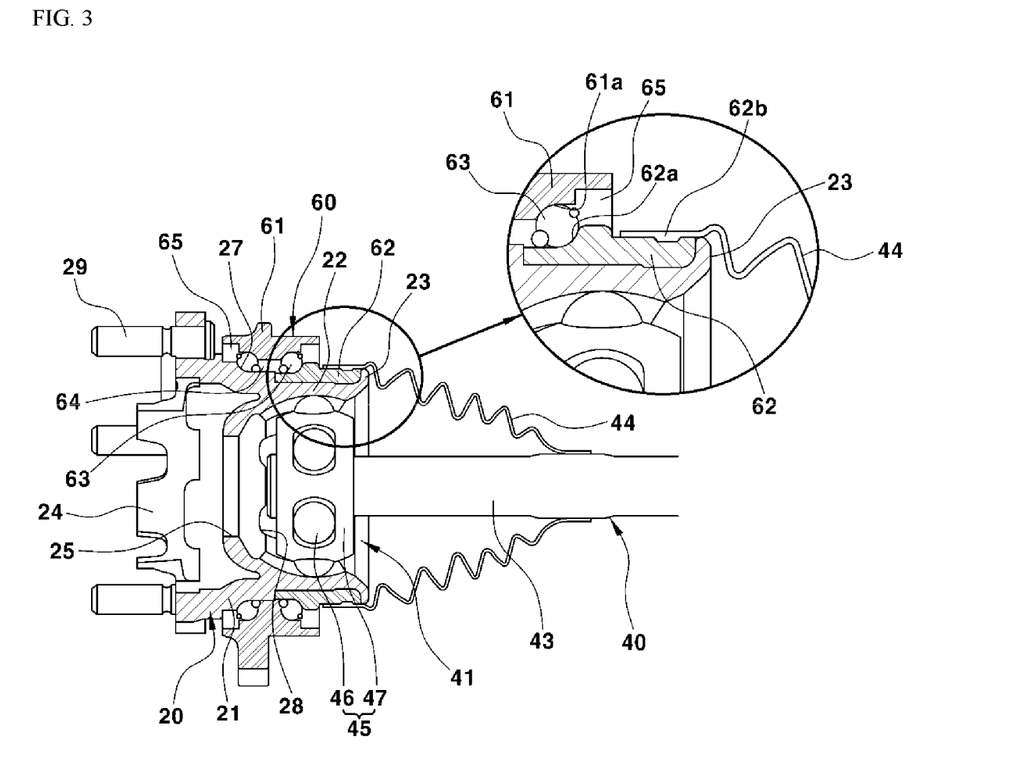
FIG. 3 is an enlarged partial cross-sectional view illustrating the axle assembly for drive wheels of vehicles according to one exemplary embodiment of the present disclosure.

Hereinafter, one exemplary embodiment of the present disclosure will be described in detail. FIG. 2 is a partial cross-sectional view illustrating an axle assembly for drive wheels of vehicles according to one exemplary embodiment of the present disclosure, FIG. 3 is an enlarged partial cross-sectional view illustrating the axle assembly for drive wheels of vehicles according to one exemplary embodiment of the present disclosure, and is an enlarged view illustrating a principal part of the axle assembly for drive wheels of vehicles. In FIGS. 2 and 3, reference numeral 65 indicates a seal which prevents inflow of foreign substances into a hub bearing 60 and prevents leakage of grease from the hub bearing 60.

Figure 4:
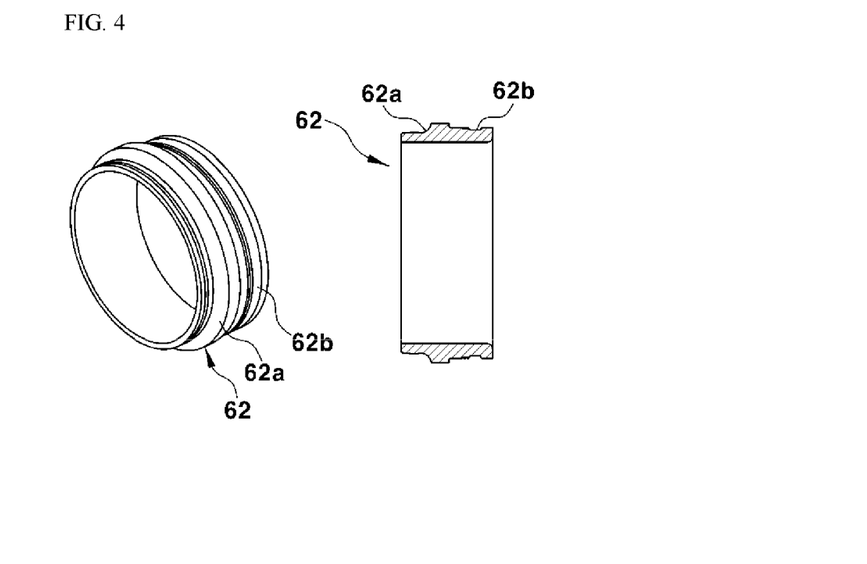
FIG. 4 is front perspective and cross-sectional views illustrating a bearing inner race of a hub bearing of the axle assembly for drive wheels of vehicles according to one exemplary embodiment of the present disclosure.
Figure 5:
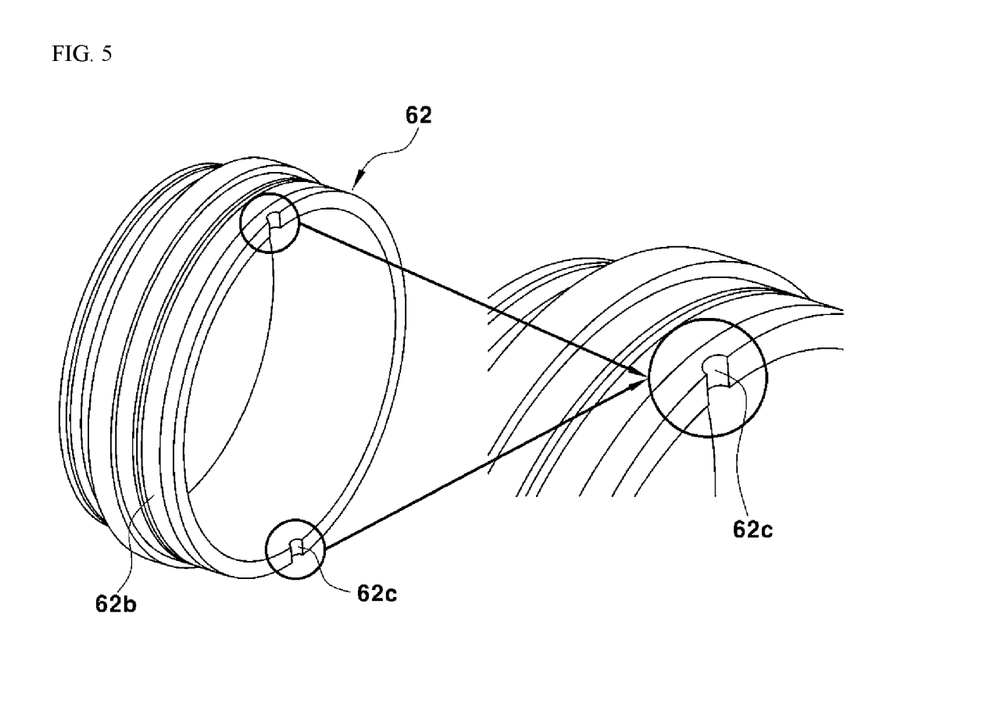
FIG. 5 and FIG. 6 are perspective views illustrating structures for preventing rotation of the bearing inner race of the hub bearing of the axle assembly for drive wheels of vehicles according to one exemplary embodiment of the present disclosure.
Figure 6:
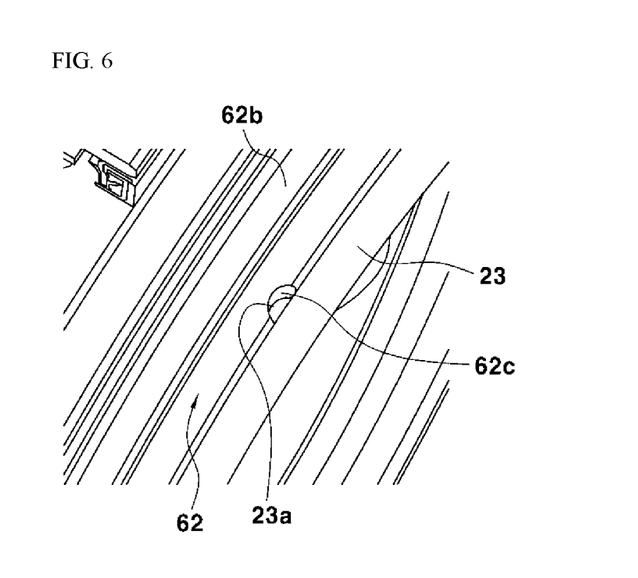
Figure 7:
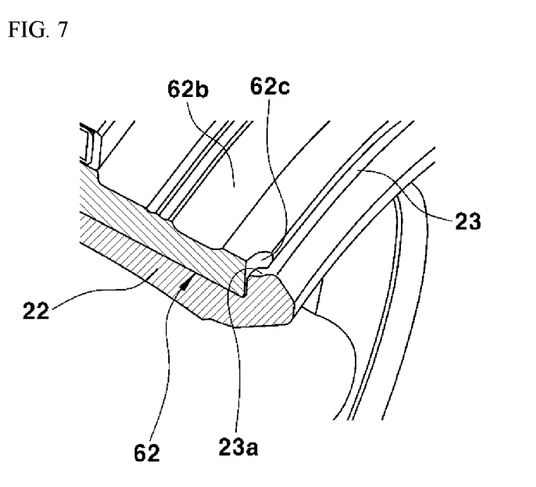
FIG. 7 is a cross-sectional view illustrating the structure for preventing rotation of the bearing inner race of the hub bearing of the axle assembly for drive wheels of vehicles according to one exemplary embodiment of the present disclosure.
Figure 8:
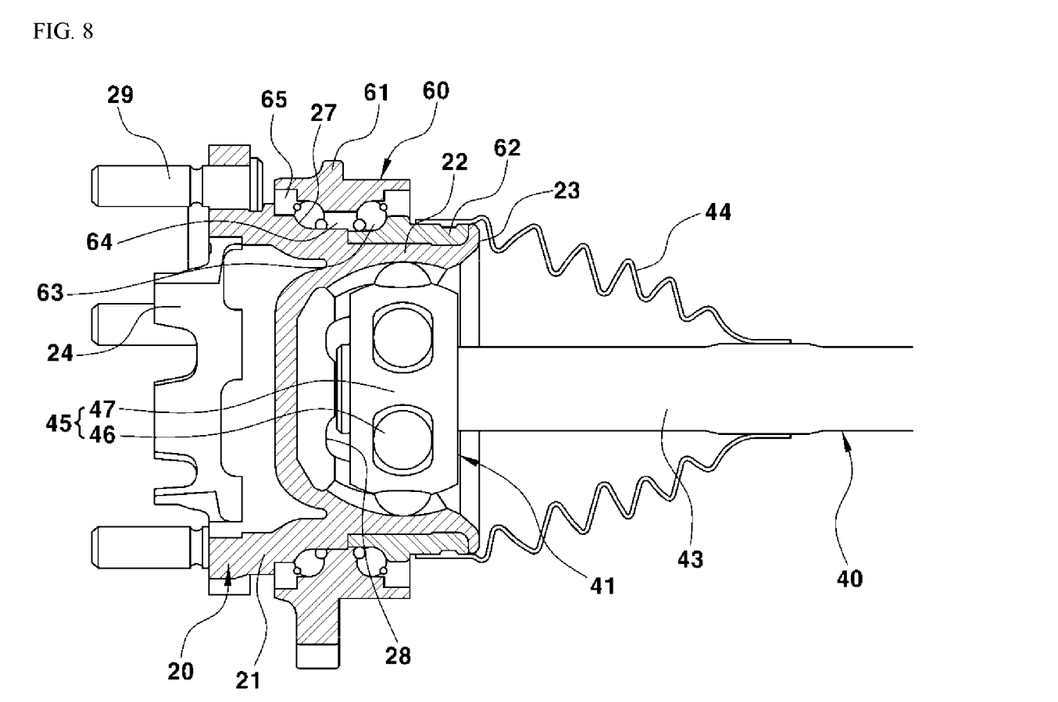
FIG. 8 is a partial cross-sectional view illustrating an axle assembly for drive wheels of vehicles according to another exemplary embodiment of the present disclosure.

FIG. 4 is front perspective and cross-sectional views illustrating a bearing inner race of the hub bearing of the axle assembly for drive wheels of vehicles according to one exemplary embodiment of the present disclosure, FIG. 5 and FIG. 6 are perspective views illustrating structures for preventing rotation of the bearing inner race of the hub bearing of the axle assembly for drive wheels of vehicles according to one exemplary embodiment of the present disclosure, and FIG. 7 is a cross-sectional view illustrating the structure for preventing rotation of the bearing inner race of the hub bearing of the axle assembly for drive wheels of vehicles according to one exemplary embodiment of the present disclosure. FIG. 8 is a partial cross-sectional view illustrating an axle assembly for drive wheels of vehicles according to another exemplary embodiment of the present disclosure.

First, the axle assembly for drive wheels of vehicles according to one exemplary embodiment of the present disclosure may include a steering knuckle (or a carrier) 10 connected to a steering apparatus (not shown), an axle housing 20 coupled to the inside of the steering knuckle 10, a wheel disc 30 fixed to the outer circumferential part of the axle housing 20 by bolts 29 to be rotatable integrally with the axle housing 20, and a drive shaft 40 which is coupled to the axle housing 20 to be rotatable integrally with the axle housing 20.

In addition, a hub bearing 60 may be provided, and the hub bearing 60 may include a bearing outer race 61 inserted into the steering knuckle 10 by press fitting, a bearing inner race 62 coupled to the outer circumferential surface of one side part of the axle housing 20 (e.g., a part of the axle housing 20 operating as an inner race), and balls 63 and a bearing cage 64 interposed between the bearing outer race 61 and the bearing inner race 62 and between the bearing outer race 61 and the other side part of the axle housing 20.

In the above configuration, the hub bearing 60 may be disposed between the steering knuckle 10 and the axle housing 20, the axle housing 20 may share a portion of the inner race thereof with the hub bearing 60, and the hub bearing 60 may support the axle housing 20 in the steering knuckle 10 to be rotatable.

In the configuration of the hub bearing 60, the balls 63 and the bearing cage 64 are configured to be rotatable and movable between track parts 61a and 62a of the bearing outer race 61 and the bearing inner race 62, the bearing outer race 61 coupled to the steering knuckle 10 supports all the elements of the hub bearing 60 and may also operate as an outer track for the balls 63, and the bearing inner race 62 maintains the preload of the hub bearing 60 and may also operate as an inner track for the balls 63.

The track parts 61a and 62a may be formed on the inner circumferential surface of the bearing outer race 61 and the outer circumferential surface of the bearing inner race 62 in the circumferential directions thereof. Further, a track part 27 may be formed on the outer circumferential surface of one side part of the axle housing 20 in the circumferential direction thereof, and the balls 63 may be rotated and moved along the track part 27.

In a general vehicle, a powertrain includes a power device configured to generate driving force to drive the vehicle and a power transfer device, and more particularly, even if not shown in the drawings, includes an engine (in a general internal combustion vehicle), a motor (in an electric vehicle) or both an engine and a motor (in a hybrid electric vehicle), and a transmission which transmits driving force. The axle housing 20 according to the present disclosure may include a wheel guide 24 to which the wheel disc 30 may be coupled via the bolts 29 and which will be described below, a wheel hub 21 on which a drive wheel (not shown) may be mounted, and a joint housing 22 formed integrally with the wheel hub 21 to form a constant velocity joint (e.g., wheel-side joint) 41.

Among the elements of the axle assembly, the drive shaft 40 may be configured to transmit driving force, generated and provided by a powertrain of the vehicle, to the drive wheel (not shown), and is provided as an assembly into which the wheel-side joint 41, a powertrain-side joint 42, a shaft 43 and a boot 44 may be combined. In particular, the wheel-side joint 41 may be the constant velocity joint, as shown in FIG. 3. In the axle assembly according to the present disclosure, the axle housing 20 is a component of the drive wheel which supports the load of the vehicle, and may be rotatable integrally with the drive shaft 40. The wheel-side joint (e.g., the constant velocity joint) 41 may connect the axle housing 20 to the drive shaft 40.

Further, in the axle assembly according to the present disclosure, the axle housing 20 has a structure in which a bearing and a constant velocity joint may be integrated, and may operate as both an inner race of the hub bearing 60 and the joint housing 22 of the wheel-side joint 41 (i.e., an outer race of the constant velocity joint). Accordingly, the joint housing 22 forming the constant velocity joint (e.g., the wheel-side joint) 41 may be formed integrally with the axle housing 20, and the balls 63 (or rollers) and the bearing cage 64 may be interposed between the bearing outer race 61 of the hub bearing 60 and one side part of the axle housing 20. Therefore, this side part of the axle housing 20 and the bearing inner race 62, which is separately mounted on the outer circumferential surface of the axle housing 20, may operate as the inner race of the hub bearing 60.

In the conventional axle assembly, among two shafts connected to the drive shaft by the wheel-side joint, one shaft passes through and is inserted into the center of the wheel hub and is spline-coupled to the wheel hub, and the joint housing of the constant velocity joint is formed integrally with the end of the shaft spline-coupled to the wheel hub to couple the joint housing to the other shaft to be rotatable integrally. On the other hand, in the axle assembly according to the present disclosure, the wheel hub 21 and the joint housing 22, which are integrated, form the axle housing 20, and the drive shaft 40 may be coupled to the inside of the joint housing 22 of the axle housing 20 to be rotatable integrally with the axle housing 20.

The wheel hub 21 of the axle housing 20 is a part on which the wheel disc 30 and the wheel (not shown) may be mounted, and the joint housing 22 of the axle housing 20 may form the constant velocity joint (e.g., the wheel-side joint) 41. In other words, the axle assembly according to the present disclosure is configured such that the joint housing 22 corresponding to a portion of the axle housing 20 is substituted for the joint housing (e.g., the outer race) of the constant velocity joint of the conventional drive shaft, and has a structure, in which the axle housing 20 and the drive shaft 40 may be directly connected by the constant velocity joint, unlike the conventional structure, in which two shafts are connected by the constant velocity joint and one of the two shafts is spline-coupled to the wheel hub.

Referring to FIG. 2 and FIG. 3, a joint sub-assembly 45 provided at the end of the drive shaft 40, i.e., the joint sub-assembly 45 including balls 46, a cage 47, etc., may be coupled to the inside of the joint housing 22 of the axle housing 20. In the present disclosure, the drive shaft 40 may be coupled to the joint housing 22 of the axle housing 20 through the joint sub-assembly 45, thereby allowing the drive shaft 40 and the axle housing 20 to be rotatable integrally.

In particular, to rotate the axle housing 20 and the drive shaft 40 integrally, the drive shaft 40 may be coupled to the axle housing 20 to thus insert the balls 46 of the joint sub-assembly 45 of the drive shaft 40 respectively into ball reception recesses 38 formed in the joint assembly 22 of the axle housing 20. Consequently, in the axle assembly according to the present disclosure, the axle housing 20 provided with the joint housing 22, and the drive shaft 40 coupled to the joint housing 22 through the joint sub-assembly 45 form a type of drive axle.

Further, the joint housing 22 forming the constant velocity joint (e.g., the wheel-side joint) 41 may be formed integrally with the axle housing 20, and thus, the axle housing 20 may transmit driving force and torque in addition to the original function thereof of supporting the load of the vehicle. In addition, in the axle assembly according to the present disclosure, since the joint housing 22 may be formed integrally with the joint housing 22, among the two shafts connected through the wheel-side joint in the drive shaft of the conventional axle assembly, the shaft 5' (in FIG. 1) coupled to the wheel hub and the caulking nut 6 (in FIG. 1) configured to couple and fix the shaft 5' to the wheel hub may be omitted.

Furthermore, in the axle assembly according to the present disclosure, the axle housing 20 has a functionally integrated structure in which the wheel hub 21, the bearing inner race 62 of the hub bearing 60, and the joint housing 22 of the constant velocity joint (e.g., the wheel-side joint 41) may be integrated, thereby simplifying the configuration and structure thereof, reducing the number of components and costs, and improving fuel economy due to weight reduction and decreased rotational inertia. Particularly, noise which conventionally occurs at the coupling part between the axle housing 20 and the drive shaft 40 and a boundary part between components may be prevented (i.e., a conventional washer for preventing noise may be omitted), backlash which occurs conventionally at the spline coupling part may be prevented by omitting the spline-coupling structure, and loosening of the caulking nut may be prevented by omitting the caulking nut.

By a comparison between FIGS. 1 and 2, a distance d1 between the center of the wheel and the center of the constant velocity joint 41 of the axle assembly according to the present disclosure becomes less than a distance d2 in the conventional axle assembly, thereby achieving the angle improvement effect of the constant velocity joint 41. Additionally, compared to the configuration of the conventional axle assembly, the axle assembly according to the present disclosure is configured such that the center of the wheel-side joint 41 may be moved further in the outward direction of the vehicle (in the leftward direction in the drawings), thereby being capable of increasing the length of the drive shaft 40 and thus improving the angle of the drive shaft 40.

In particular, an offset between the center of the wheel and the constant velocity joint 41 of the drive shaft 40 may be optimized and thus strength and angle improvement effects may be maximized, torque-steer due to the angle and shudder vibration during startup may be reduced, and the usable angular range of the wheel-side joint (e.g., the constant velocity joint) 41 may be increased and thus the driving performance of the vehicle and therefore the marketability thereof may be improved due to the reduction in the minimum turning radius.

Further, as shown in FIG. 2 and FIG. 3, the bearing inner race 62 may be coupled to the outer circumferential surface of the joint housing 22 of the axle housing 20, and a forming part 23, which is bent outwards in the radial direction through an orbital forming process, may be formed at the end of the axle housing 20, i.e., the end of the joint housing 22. In other words, by forming the forming part 23 through the orbital forming process in the state in which the bearing inner race 62 is coupled to the outer circumferential surface of the joint housing 22 of the axle housing 20, when the orbital forming process is performed, the forming part 23 formed at the end of the joint housing 22 may press the bearing inner race 62 to fix the bearing inner race 62.

Accordingly, by forming the forming part 23 to be pressed against the side end of the bearing inner race 62, the bearing inner race 62 may be integrally fixed to the axle housing 20 in the state in which the bearing inner race 62 is engaged with the side part of the axle housing 20 by the forming part 23, and thereby, separation of the bearing inner race 62 from the axle housing 20 may be prevented. The orbital forming process is a forming method for rolling up the end of the joint housing 22 of the axle housing 20, operating as the outer race of the constant velocity joint (e.g., the wheel-side joint) 41, and may be applied to integrally fix the bearing inner race 62 of the hub bearing 20 to the joint housing 22 of the axle housing 20.

By forming the forming part 23 through the orbital forming process to fix the bearing inner race 62 to the axle housing 20, separate fastening components for fixing the bearing inner race 62 may be omitted, thus contributing to a reduction in the number of components, cost reduction and weight reduction. Further, the bearing inner race 62 of the hub bearing 60, mounted on the outer circumferential surface of the joint housing 22 of the axle housing 20 by press fitting, may be pressed during the orbital forming process to maintain bearing preload, and the bearing preload is important in determining the durability of the hub bearing 60 and therefore the lifespan thereof.

In the axle assembly according to the present disclosure, the orbital forming process may be applied to fix the bearing inner race 62, thereby being capable of facilitating preload management of the hub bearing 60, improving the durability and prolonging the lifetime of the hub bearing 60, and further improving productivity. Additionally, in the conventional axle assembly, the boot 5*d* is fixed to the outer circumferential surface of the joint housing 5*a*' of the drive shaft 5 by the band 5*f*, as shown in FIG. 1, but, in the axle assembly according to the present disclosure, the boot 44 may be fixedly coupled to the outer circumferential surface of the bearing inner race 62 of the hub bearing 60 by a band (not shown), as shown in FIG. 2. In particular, the boot 44 may be installed to surround the coupling part of the wheel-side joint (e.g., the constant velocity joint) 41.

FIG. 4 illustrates the bearing inner race 62 of the hub bearing 60, and the track part 62*a* along which the balls 63 are movable may be continuously formed on the outer circumferential surface of the bearing race 62 at a first side of the bearing inner race 62 in the circumferential direction, in the same manner as a conventional axle assembly.

Further, a boot coupling part 62*b*, to which the inner surface of the boot 44 is fixed, may be formed at a second side of the bearing inner race 62, and the boot 44 may be fixed to the bearing inner race 62 by winding the band (not shown) on the outer circumferential surface of the boot 44 to press the outer circumferential surface of the boot 44, after the inner surface of the boot 44 is adhered to the boot coupling part 62*b*. Structures for preventing rotation of the bearing inner race 62 in the state in which the bearing inner race 62 is coupled to the outer circumferential surface of the joint housing 22 of the axle housing 20 are provided, and such structures for preventing rotation of the bearing inner race 62 are shown in FIGS. 5 to 7.

As exemplarily shown in shown in FIGS. 5 to 7, recesses 62*c* for preventing rotation may be formed in a first side end of the bearing inner race 62, and protrusions 23*a* inserted into the recesses 62*c* when the bearing inner race 62 is coupled to the outer circumferential surface of the joint housing 22 of the axle housing 20 may be formed on the forming part 23. The protrusions 23*a* may be formed by plastic deformation so that at least portions of the end of the joint housing 22 formed as the forming part 23 may be inserted into the recess 62*c* for preventing rotation of the bearing inner race 62 when the forming part 23 is formed at the end of the joint housing 22 by the orbital forming process.

Particularly, a plurality of recesses 62*c* disposed at predetermined intervals in the circumferential direction of the bearing inner race 62 may be formed in the bearing inner race 62, and the protrusions 23*a* may be formed on the end of the joint housing 22 at positions that correspond to the recesses 62*c* of the bearing inner race 62 by plastic deformation during the orbital forming process and may be inserted into the recesses 62*c*. Accordingly, the protrusions 23*a* formed by plastic deformation during the orbital forming process for forming the joint housing 22 of the axle housing 20 may be inserted into the recesses 62*c* of the bearing inner race 62 to thus prevent the bearing inner race 62 from being rotated within the axle housing 20.

Accordingly, since the orbital forming process may be applied to fix the bearing inner race 62 in the axle housing 20, fixation of the bearing inner race 62 and prevention of rotation of the bearing inner race 62 may be achieved using only the orbital forming process, and thus separate components for fixing the bearing inner race 62 and for preventing rotation of the bearing inner race 62 may be omitted, and productivity may be improved.

Although this exemplary embodiment of the present disclosure describes that the protrusions 23*a* are formed on the forming part 23 of the joint housing 22 and the recesses 62*c* are formed in the bearing inner race 62, protrusions may be formed on the bearing inner race 62 and recesses may be formed in the forming part 23 of the joint housing 22. For example, recesses for preventing rotation may be formed in the axle housing 20, more particularly, in the forming part 23 of the joint housing 22, and protrusions which are inserted into the recesses may be formed on the bearing inner race 62. In particular, when the forming part 23 is formed by performing the orbital forming process of the end of the axle housing 20, the recesses, into which the protrusions are inserted, may be formed in the forming part 23 by deforming the end of the axle housing 20.

Further, the recesses or the protrusions may be formed at a right or first side end of the bearing inner race 62, to which the forming part 23 disposed at the right side in FIG. 3 is coupled, i.e., at the right side end of the bearing inner race 62 and the protrusions or the recesses may be formed at the corresponding positions of the forming part 23, or alternatively, the recesses and the protrusions may be formed at a left or second side end of the bearing inner race 62 in FIG. 3 and one surface of the joint housing 22 coupled thereto (i.e., the inner surface of the joint housing 22 into which the bearing inner race 62 is inserted).

As shown in FIG. 2 and FIG. 3, an opening 25 may be formed through the joint housing 22 of the axle housing 20, and a hub cap 26 may be detachably assembled with the opening 25 to facilitate after-sales service (A/S) of the drive shaft 40. During A/S, after the hub cap 26 is removed, servicing may be performed and then the hub cap 26 may be assembled with the opening 25 again to close the opening 25.

In general, the drive shaft 40 and the inner race of the joint sub-assembly 45 of the wheel-side joint 41 may be fixed by a snap-ring or a retainer ring. According to the above-described configuration, during A/S, after the hub cap 26 is removed, a tool for separating and removing both elements may enter the opening 25. In addition, at normal times or after A/S is completed, the hub cap 26 may be coupled to the opening 25 to close the opening 25, thereby preventing inflow of foreign substances into the wheel-side joint 41 and leakage of grease from the wheel-side joint 41.

As shown in FIG. 8, an axle assembly for drive wheels of vehicles according to another exemplary embodiment of the present disclosure may have a closed-type housing structure without a separate hub cap, and the closed-type housing structure without an opening and a hub cap may be applied to a structure in which a cage 47 of a wheel-side joint 41 is fixed to a drive shaft 40 by a circlip.

In FIGS. 2, 3 and 8, reference numeral 24 indicates a wheel guide, and in the present disclosure, the wheel guide 24 may be an integrated-type wheel guide which is formed integrally with the axle housing 20, or be a separated-type wheel guide which is separately manufactured and then detachably coupled to the axle housing 20. The wheel guide 24 is an element to which a wheel (not shown) may be coupled to be guided, and if the wheel guide 24 is a separated-type wheel guide, the wheel guide 24 may be coupled to the axle housing 20 from the outer surface thereof by press fitting.

As is apparent from the above description, an axle assembly for drive wheels of vehicles according to the present disclosure solves conventional problems, such as occurrence of noise and backlash at a coupling part between a wheel hub and a drive shaft, loosening of a caulking nut, etc.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. An axle assembly for drive wheels of vehicles, comprising:
    a steering knuckle connected to a steering apparatus;
    an axle housing coupled to an inside of the steering knuckle;
    a wheel disc fixed to the axle housing to be rotatable integrally with the axle housing;
    a drive shaft coupled to the axle housing to be rotatable integrally with the axle housing;
    a hub bearing coupled to the steering knuckle and the axle housing to be disposed therebetween;
    recesses for preventing rotation, wherein the recesses are formed in the bearing inner race; and
    protrusions configured to be inserted into the recesses, wherein the protrusions are formed on the axle housing to prevent rotation of the bearing inner race within the axle housing in a state in which the protrusions of the axle housing are inserted into the recesses of the bearing inner race;
    wherein a forming part is bent outwards in a radial direction and is formed at an end of the axle housing in a state in which a bearing inner race of the hub bearing is coupled to an outer circumferential surface of the axle housing, and
    wherein the bearing inner race is engaged with a side part of the axle housing by the forming part in a state in which the forming part is pressed against a side end of the bearing inner race to integrally couple the axle housing and the bearing inner race to each other.

2. The axle assembly of claim 1, wherein the forming part is formed by performing an orbital forming process on the end of the axle housing.

3. The axle assembly of claim 1, wherein the protrusions are formed at the forming part of the axle housing.

4. The axle assembly of claim 3, wherein the forming part is formed by performing an orbital forming process on the end of the axle housing, and the protrusions are formed by deforming at least portions of the end of the axle housing to be inserted into the recesses of the bearing inner race during the orbital forming process.

5. The axle assembly of claim 1, wherein the hub bearing includes:
    a bearing outer race inserted into the steering knuckle by press fitting;
    the bearing inner race coupled to an outer circumferential surface of a first side part of the axle housing; and
    balls and a bearing cage interposed between the bearing outer race and the bearing inner race and between the bearing outer race and a second side part of the axle housing.

6. The axle assembly of claim 1, wherein a boot installed to surround a coupling part between the drive shaft and a wheel-side joint is fixedly coupled to an outer circumferential surface of the bearing inner race of the hub bearing.

7. The axle assembly of claim 6, further comprising:
    balls interposed between an outer circumferential surface of a first side part of the bearing inner race and a bearing outer race of the hub bearing; and
    a band coupled to an outer surface of the boot in a state in which an inner surface of the boot is pressed against an outer circumferential surface of a second side part of the bearing inner race to fix the boot to the bearing inner race by the band.

8. The axle assembly of claim 1, further comprising:
    a joint housing formed integrally with the axle housing; and
    a joint sub-assembly of the driven shaft including balls and a cage and coupled to an inside of the joint housing of the axle housing to couple the drive shaft and the axle housing to each other to be integrally rotated by a wheel-side joint comprising the joint housing and the joint sub-assembly.

9. The axle assembly of claim 8, wherein an opening is formed through the joint housing, and a hub cap is detachably coupled to the opening to close the opening.

10. The axle assembly of claim 8, wherein one of an integrated-type wheel guide configured to be formed integrally with the joint housing, and a separated-type wheel guide configured to be detachably coupled to the joint housing is provided.

11. An axle assembly for drive wheels of vehicles, comprising:
    a steering knuckle connected to a steering apparatus;
    an axle housing coupled to an inside of the steering knuckle;
    a wheel disc fixed to the axle housing to be rotatable integrally with the axle housing;
    a drive shaft coupled to the axle housing to be rotatable integrally with the axle housing;
    a hub bearing coupled to the steering knuckle and the axle housing to be disposed therebetween,
    recesses for preventing rotation, wherein the recesses are formed in the axle housing; and
    protrusions configured to be inserted into the recesses, wherein the protrusions are formed on the bearing inner race to prevent rotation of the bearing inner race within the axle housing in a state in which the protrusions of the bearing inner race are inserted into the recesses of the axle housing;
    wherein a forming part is bent outwards in a radial direction and is formed at an end of the axle housing in a state in which a bearing inner race of the hub bearing is coupled to an outer circumferential surface of the axle housing; and
    wherein the bearing inner race is engaged with a side part of the axle housing by the forming part in a state in which the forming part is pressed against a side end of the bearing inner race to integrally couple the axle housing and the bearing inner race to each other.

12. The axle assembly of claim 11, wherein the recesses are formed in the forming part of the axle housing.

13. The axle assembly of claim 12, wherein the forming part is formed by performing an orbital forming process on the end of the axle housing, and the recesses are formed by deforming the end of the axle housing by inserting the protrusions of the bearing inner race into the end of the axle housing during the orbital forming process.

* * * * *